(12) United States Patent
Nusier et al.

(10) Patent No.: US 8,398,154 B1
(45) Date of Patent: Mar. 19, 2013

(54) DEFLECTOR FOR CHANGING THE COURSE OF A VEHICLE IN AN OFFSET IMPACT

(75) Inventors: Saied Nusier, Canton, MI (US); Mohamed Ridha Baccouche, Ann Arbor, MI (US); Jamel E. Belwafa, Ann Arbor, MI (US); Saeed David Barbat, Novi, MI (US); Xiaowei Li, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/327,861

(22) Filed: Dec. 16, 2011

(51) Int. Cl.
*B60R 19/34* (2006.01)
(52) U.S. Cl. .................. 296/187.1; 296/187.09; 280/784
(58) Field of Classification Search ............. 296/187.09, 296/187.1; 280/784
See application file for complete search history.

(56) References Cited

U.S. PATENT DOCUMENTS

| | | | |
|---|---|---|---|
| 3,520,550 A * | 7/1970 | Dysarz et al. ................. | 180/312 |
| 4,424,986 A | 1/1984 | Mizuno et al. | |
| 6,511,119 B2 * | 1/2003 | Takase et al. ............ | 296/187.09 |
| 6,929,297 B2 * | 8/2005 | Muller et al. ................. | 293/133 |
| 6,957,846 B2 * | 10/2005 | Saeki ......................... | 296/187.1 |
| 7,370,886 B2 * | 5/2008 | Luttinen et al. ............... | 280/781 |
| 7,819,218 B2 * | 10/2010 | Eichberger et al. ........... | 180/274 |
| 2011/0133512 A1 * | 6/2011 | Mildner et al. .......... | 296/187.09 |

FOREIGN PATENT DOCUMENTS

GB 2404635 A 2/2005

* cited by examiner

*Primary Examiner* — Joseph Pape
(74) *Attorney, Agent, or Firm* — Jason Rogers; Brooks Kushman P.C.

(57) ABSTRACT

A deflector is attached to a sub-frame in the front end of a vehicle that rotates the front end of the vehicle in the event the vehicle contacts an object outboard of the sub-frame. The deflector has a deflection beam that is supported on an outboard end by a reaction leg. The reaction leg is backed by an attachment leg that is secured in a parallel orientation to a part of the sub-frame.

11 Claims, 6 Drawing Sheets

DEFLECTOR FOR CHANGING THE COURSE OF A VEHICLE IN AN OFFSET IMPACT

TECHNICAL FIELD

This disclosure relates to a deflector attached to a sub-frame, or other frame part, of a vehicle that displaces the vehicle laterally or imparts a rotational moment to the vehicle in a frontal impact with a laterally offset object.

BACKGROUND

Vehicles are designed and tested for crash worthiness. One parameter in testing vehicle design is the extent of any intrusion into a passenger compartment of a vehicle as a result of a crash test. Intrusion may be measured in a variety of locations, including areas identified, for example, as the toe pan, brake pedal, instrument panel, footrest and door.

Frontal crash tests previously focused on impacts with objects that are centrally located, general between the frame rails of the vehicle. The bumper beam of a vehicle is generally secured to the vehicle frame through crush cans, or other intervening structures, that are designed to absorb energy. Crush cans absorb impact energy by progressively collapsing. Intrusion into the passenger compartment is reduced by the energy absorbed by the crash cans.

Recently, more stringent standards have been proposed that are designed to test a vehicle in a 40 mph crash with an object that is located in the outer one-fourth of the transverse width of the vehicle. Impacts in this area are outboard of the vehicle frame. It is not feasible to provide additional crush cans in this area to absorb the impact because the crush cans are not aligned with the vehicle frame that is disposed inboard of the object.

There is a need to improve the crash worthiness of the vehicle with an offset object. This disclosure addresses the above problems and challenges relating to vehicle design. The extent of intrusion in the event of an offset impact is reduced by applying the disclosed concept as summarized below and with reference to the illustrated embodiments.

SUMMARY

According to one aspect of this disclosure, an apparatus is provided for managing the energy of a frontal impact by a vehicle having a sub-frame with an object on a first side of the vehicle located outboard of the sub-frame. The apparatus comprises a deflector attached to the sub-frame laterally outboard of the sub-frame. The deflector is secured to the sub-frame at an angle relative to a longitudinal direction so that the deflector rotates the vehicle so that the first side moves toward a longitudinal centerline during the impact.

According to other aspects of the disclosure, the deflector may be secured to the sub-frame at an inboard end of the deflector and the apparatus may further comprise a reaction leg secured on a first end to an outboard end of the deflector and on a second end to the sub-frame. The reaction leg reinforces the deflector to reduce deformation of the outboard end toward the sub-frame. An attachment leg extends rearwardly from the second end of the reaction leg and may be secured in a parallel relationship to a longitudinally extending beam of the sub-frame.

The sub-frame is disposed about an engine of the vehicle and is attached to the vehicle frame. The deflector may further comprise at least two beams that are stacked in a vertical relationship to provide additional robustness. The deflector may be oriented at an angle of between 15° and 75° relative to a transverse plane. More specifically, the deflector may be oriented at an angle of between 40° and 50° relative to the transverse plane or may be oriented at an angle of about 45° relative to the transverse plane.

According to another aspect of the disclosure, an apparatus is provided for managing kinetic energy of a frontal impact with an object by a vehicle having a passenger compartment. The apparatus comprises a frame assembly and a bumper beam that is attached to the frame assembly. One or more impact absorbing elements are attached between the frame assembly and the bumper beam. Impacts occurring outboard of the frame are not fully absorbed by the impact absorbing elements. A pair of deflectors are attached to the frame assembly laterally outboard of the frame assembly and rearward of the bumper beam. The deflectors may be attached to the frame assembly at an angle of between 15° and 75° relative to a transverse plane with a leading inner end and a trailing outer end. The vehicle rotates away from the object to reduce intrusion of the object into the passenger compartment in the event an impact occurs outboard of the frame assembly.

According to other aspects of the disclosure, the deflectors may be secured to the sub-frame at an inboard end of each of the deflectors. The apparatus may further comprise a reaction leg secured on a first end to each of the deflectors at an outboard end of each of the deflectors. The reaction legs may be secured to the sub-frame on a second end of each of the reaction legs. The reaction legs reinforce each of the deflectors to reduce deformation of the outboard ends toward the sub-frame. In addition, an attachment leg may be provided that extends rearwardly from the second end of each of said reaction legs. The attachment legs may each be secured in a parallel relationship to a pair of longitudinally extending beams of the frame assembly.

According to another aspect of the disclosure, a pair of tire and wheel assemblies may be disposed laterally outboard of opposite sides of the frame assembly so that the deflectors are each located between the bumper beam and one of the tire and wheel assemblies.\

According to another aspect of the disclosure, a method is disclosed for managing energy in a frontal impact of a vehicle with an object that is offset towards a first side of the vehicle and outboard of a sub-frame. The method comprises the steps of providing a deflector on the sub-frame that has a deflection beam that is oriented at an angle relative to a longitudinal direction. Moving the vehicle into the object to impact the object with the deflection beam. Rotating a front end of the vehicle inwardly in response to the deflection beam contacting the object.

The above and other aspects of the disclosure will be better understood in view of the attached drawings and the following detailed description of the illustrated embodiments.

DETAILED DESCRIPTION

A detailed description of the illustrated embodiments of the disclosed concept is provided below. The disclosed embodiments are examples that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
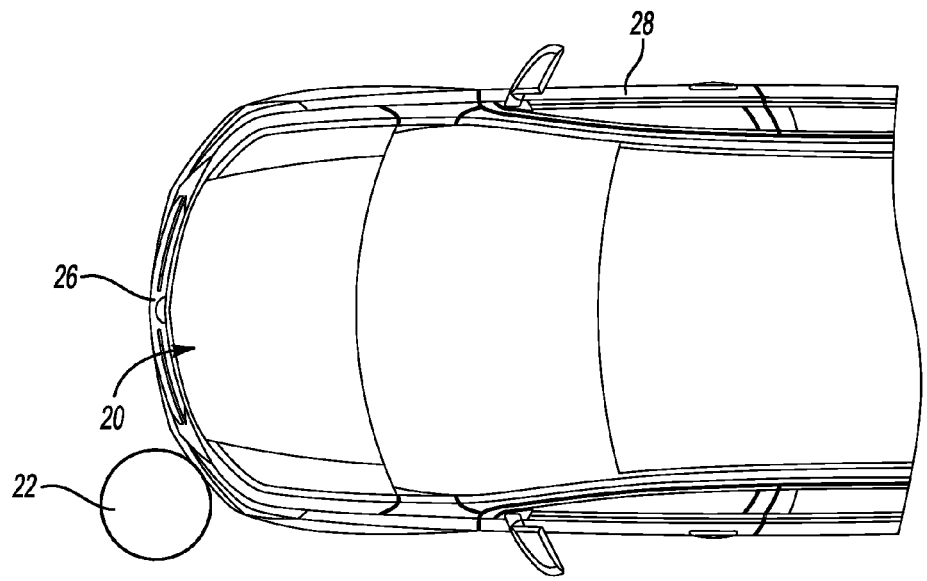
FIG. 1 is a plan view of a vehicle contacting a pole disposed in the outer portion of the transverse width of the vehicle.
Figure 2:
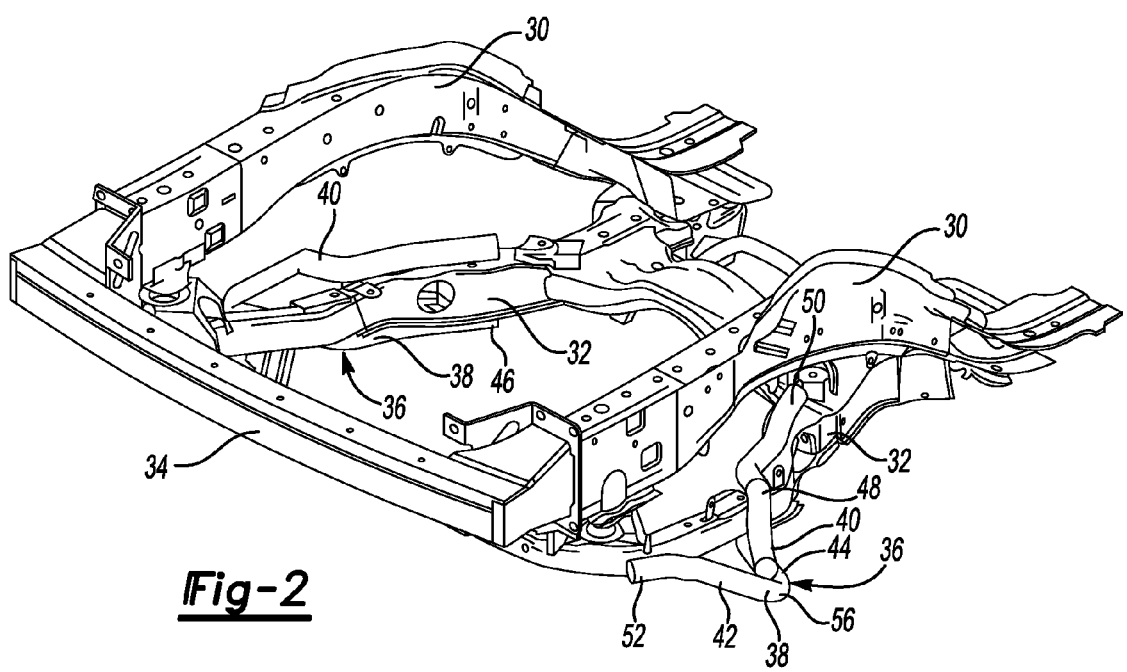
FIG. 2 is a perspective view of a vehicle frame, sub-frame, bumper beam and deflectors.
Figure 3:
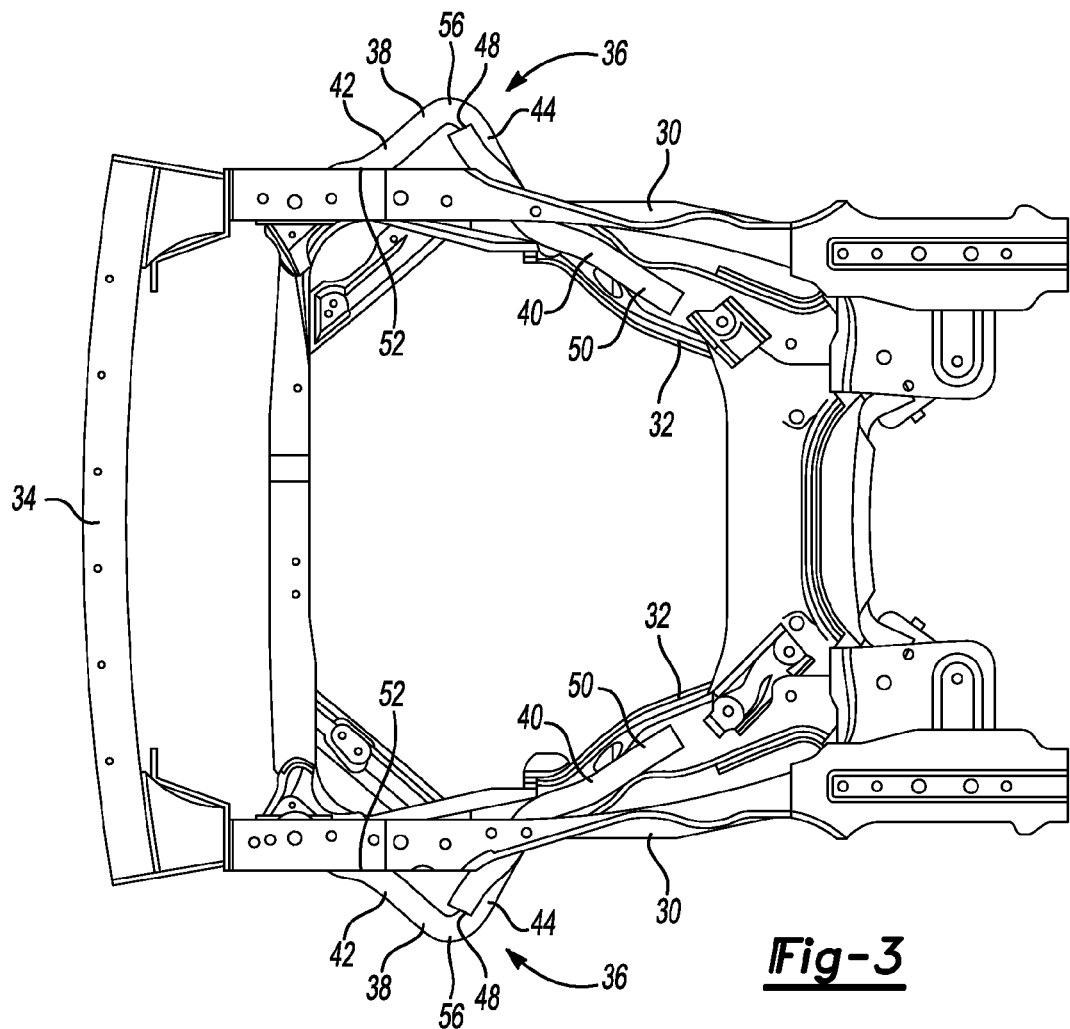
FIG. 3 is a top plan view of the vehicle frame components shown in FIG. 2.
Figure 4:
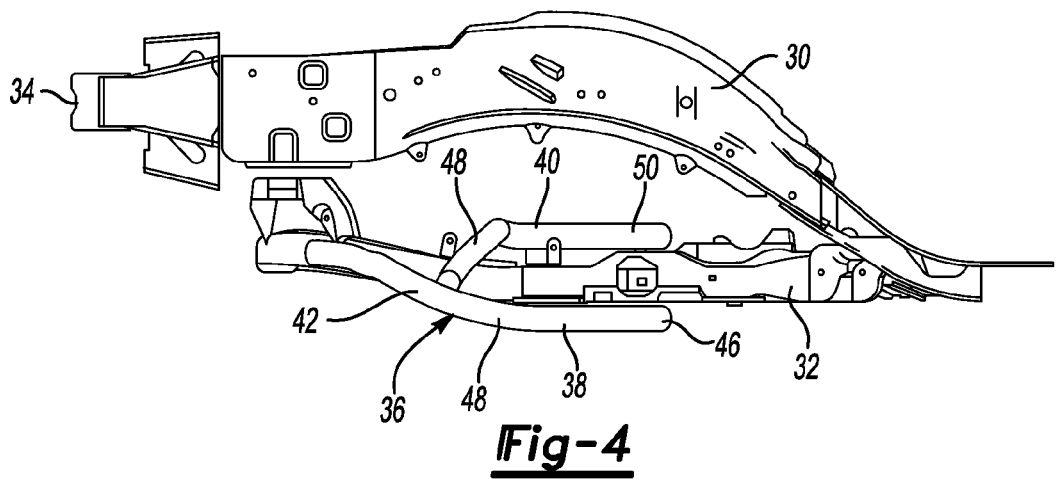
FIG. 4 is a side elevation view of the vehicle components shown in FIG. 2.
Figure 5:
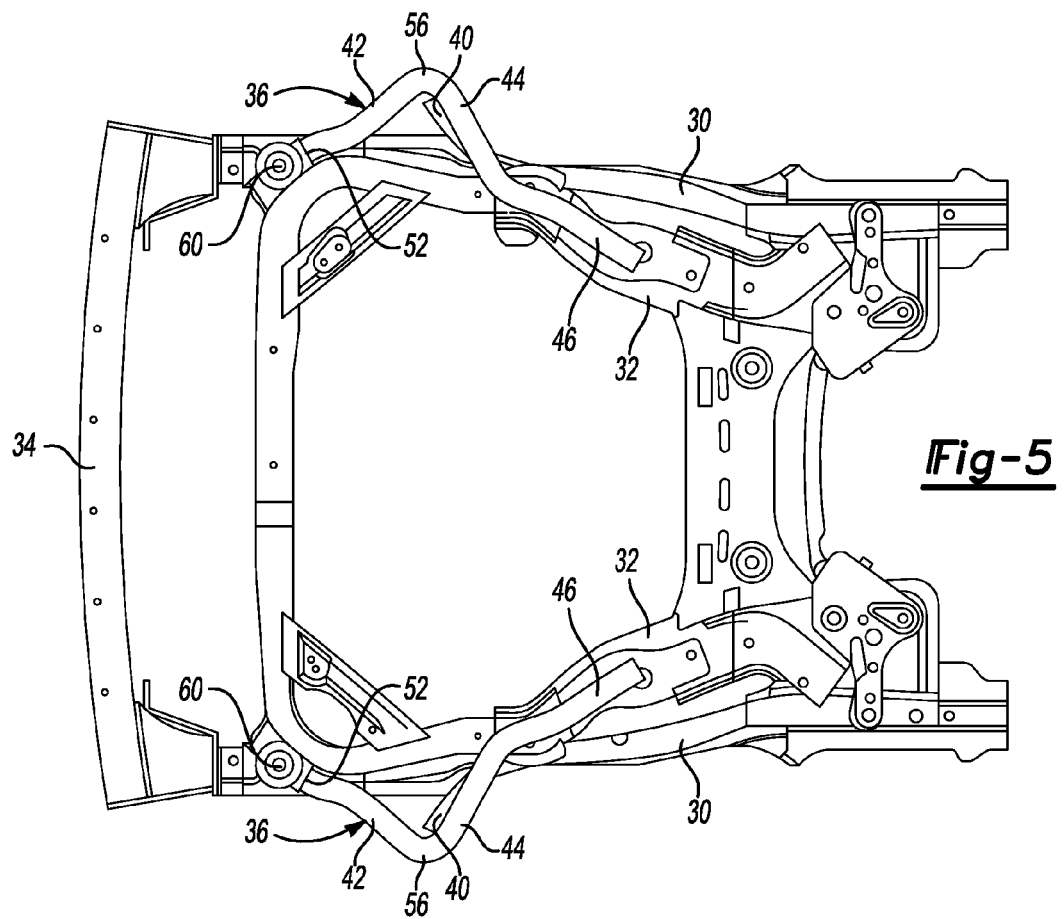
FIG. 5 is a bottom plan view of the vehicle components shown in FIG. 2.

Referring to FIG. 1, a vehicle 20 is shown as it engages a test pole 22. The vehicle 20 contacts the test pole 22 in the outer lateral portion of the vehicle 20 in accordance with the Insurance Institute for Highway Safety (IIHS) for a 40 mph offset frontal pole test. The vehicle 20 is driven into the pole 22 so that it contacts the front bumper 26 adjacent the left side 28 of the vehicle.

Referring to FIGS. 2-5, a portion of the structural frame of the vehicle 20 is shown to include frame rails 30 that extend longitudinally in the vehicle. The sub-frame rails 32 are connected to the frame rails 30 to support the engine (not shown) of the vehicle 20. A bumper beam 34 is connected to the frame rails 30. Energy absorbing members, such as crush cans (not shown), may be incorporated in the front end of the vehicle 20 to absorb energy in the event of a collision.

A deflector assembly 36 is included on both sides of the sub-frame rails 32. The deflector assembly 36 includes a lower deflector 38 and an upper deflector 40 in the illustrated embodiment. It should be understood that the deflector assembly 36 may include a single deflector corresponding to lower deflector 38 or may include three or more deflectors.

The lower deflector 38 includes a deflection leg 42 that is preferably oriented at approximately 45° relative to the longitudinal axis of the vehicle. The deflection leg 42 may be attached to the frame assembly at an angle of between 15° and 75° relative to the longitudinal direction. Alternatively, the deflection leg 42 may be disposed at an angle of between 40° and 50° relative to the longitudinal direction. A reaction leg 44 is formed rearward of the deflection leg 42 and is provided to support the outer end of the deflection leg 42. An attachment leg 46 may be formed rearward of the reaction leg 44 to provide a substantial attachment area between the attachment leg 46 and the sub-frame rail 32 to which it is attached.

The upper deflector 40 may include a reaction leg 48 that is generally parallel to the reaction leg 44 of the lower deflector 38. An attachment leg 50 may also be provided on the upper deflector 40 that is substantially parallel to the attachment leg 46 and may be attached to the opposite side of the sub-frame rail 32 as the attachment leg 46 of the lower deflector 38.

The deflector assembly 36 has an inboard end 52 that is attached to one of the sub-frame rails 32 and an outboard end 56. The outboard end 56 is supported by the reaction leg 44 and reaction leg 48 at the outboard end 56. Each of the reaction legs 44 and 48 are supported by attachments legs 46 and 50.

Referring to FIGS. 6-12, a crash test is illustrated diagrammatically. The vehicle 20 is shown in the course of a collision with the pole 22. The vehicle 20 is only partially shown with the deflector assembly 36 attached to the sub-frame rails 32. The deflector assembly 36 is shown attached at a front inboard connector 60 to the sub-frame rails 32. A wheel assembly 58 is also shown.

Figure 6:
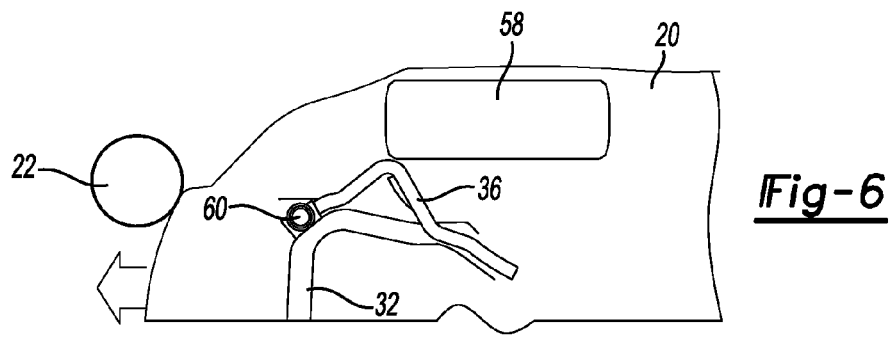
FIGS. 6-12 are a series of diagrammatic views of a vehicle in an IIHS front pole 40 mph crash test.
Figure 7:
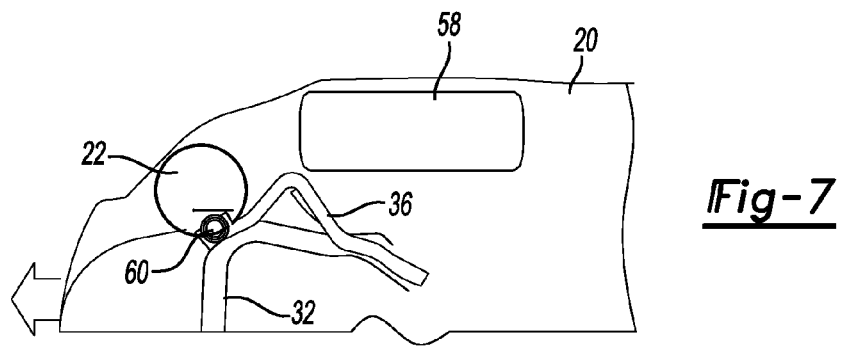

Referring to FIG. 6, the vehicle 20 is shown just as the pole 22 is contacted. In FIG. 7, the pole 22 is shown engaging the front inboard connector 60 as contact is initially made with the deflector assembly 36.

Figure 8:
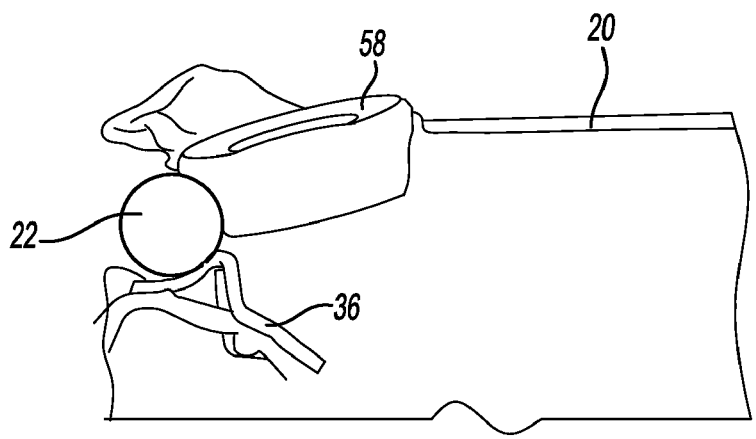

Referring to FIG. 8, the collision event is continued and the pole is in direct contact with the deflector assembly 36 and also is in contact with the wheel assembly 58. At this point, the deflector assembly 36 is beginning to cause the front part of the right side of the vehicle 20 to be deflected inwardly toward the center line of the vehicle.

Figure 9:
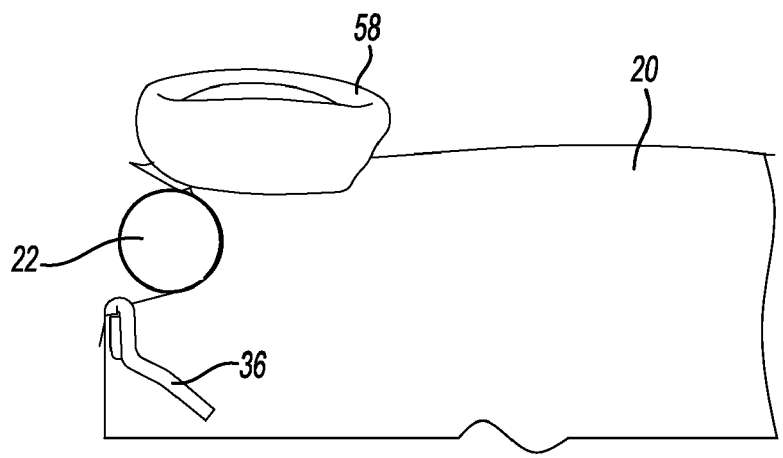

Referring to FIG. 9, the pole 22 is shown moving into the vehicle 20, but the vehicle 20 is continuing to rotate inwardly.

Figure 10:
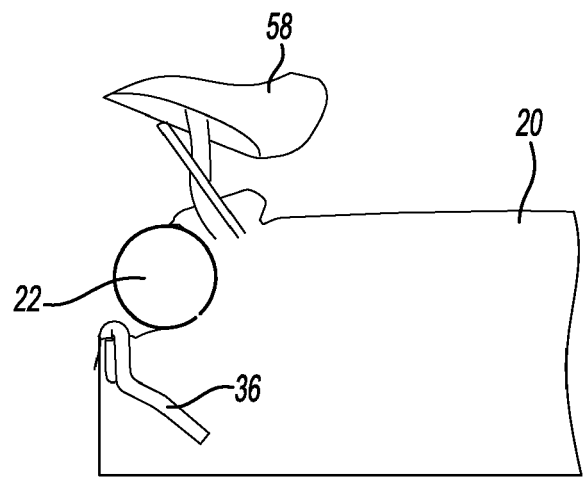

Referring to FIG. 10, the pole is shown entering the vehicle to the area where the wheel assembly 58 was formerly disposed and the vehicle is continuing to move inwardly.

Figure 11:
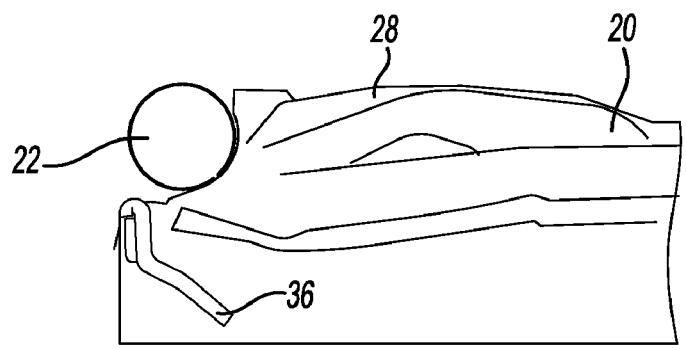

Referring to FIG. 11, the vehicle 20 is shown with the pole 22 beginning to exit the right side 28 of the vehicle 20.

Figure 12:
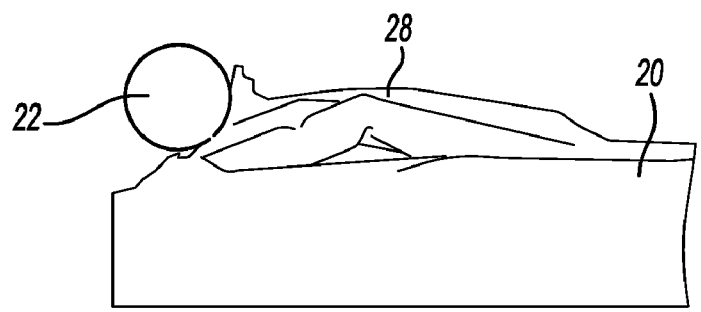

Referring to FIG. 12, the vehicle is shown with the collision event completed and the pole 22 generally being disposed in alignment with the right side 28 of the vehicle 20.

The deflector assembly 36 deflects the vehicle 20 laterally inwardly causing a rotational moment of the vehicle 20. The vehicle 20 continues to move inboard away from the right side 28 so that the pole 22 exits the vehicle 20 through the right side 28.

Figure 13:
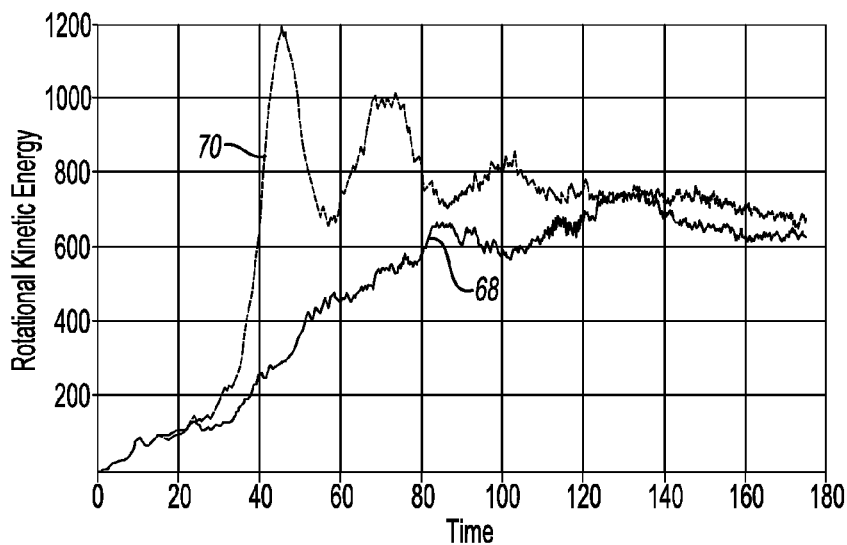
FIG. 13 is a chart showing rotational kinetic energy over time comparing a base design to the rotational kinetic energy with the disclosed deflector.

Referring to FIG. 13, a plot of the rotational kinetic energy includes a base rotational plot 68 which shows a generally linear increase in rotational kinetic energy over time from 0 to approximately 120 msec is shown by line 68. In contrast, the rotational energy plot with the deflector is shown by line 70 to have a large spike in rotational kinetic energy beginning at about 30 msec and continuing through approximately 45 msec indicating substantial vehicle rotation in response to contacting deflector assembly 36. A high level of rotational kinetic energy is also continued through approximately 120 msec. This chart illustrates the desired effect of the deflector assembly 36 causing the vehicle 20 to rotate to deflect the path of the vehicle 20 and thereby reduce intrusion into the passenger compartment.

Figure 14:
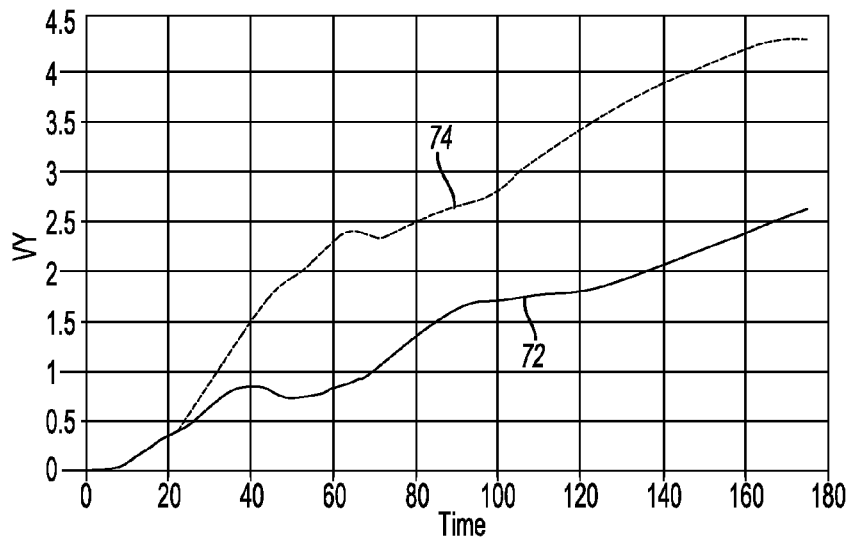
FIG. 14 is a chart showing the lateral velocity of a base design compared to a vehicle having the disclosed deflector.

Referring to FIG. 14, a base lateral velocity plot 72 is shown compared to a lateral velocity plot with a deflector 74. The lateral velocity with the deflector is substantially increased as illustrated by the chart indicating that the vehicle 20 is moved in a lateral direction as a result of the pole 22 contacting the deflector assembly 36 at approximately 30 msec into the simulated test.

Figure 15:
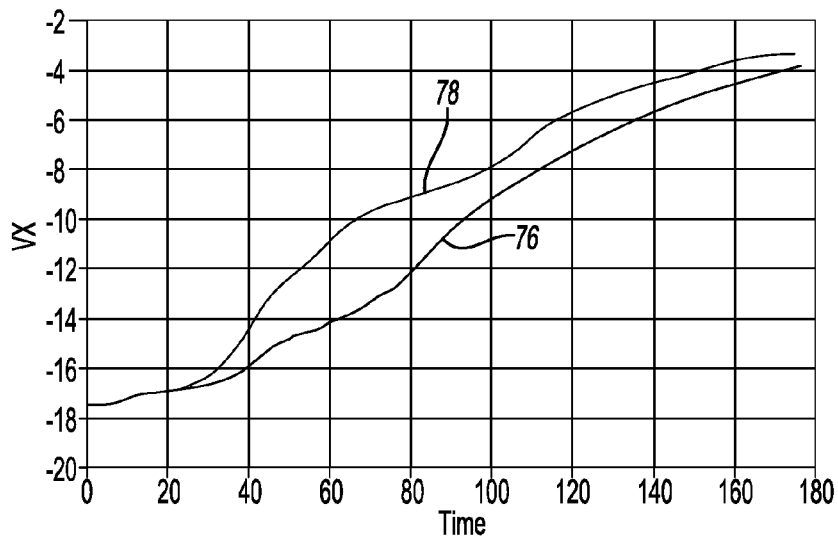
FIG. 15 is a chart showing the longitudinal velocity of a base vehicle compared to a vehicle having the disclosed deflector.

Referring to FIG. 15, a base longitudinal velocity plot 76 and a longitudinal velocity plot with deflector 36 is indicated by reference numeral 78. The velocity in the X direction decreases at the moment the deflector assembly 36 contacts the test pole 22. The reduced degree of longitudinal velocity is to be compared to the extensive rotational kinetic energy and lateral velocity plots.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for managing energy of a frontal impact by a vehicle having a sub-frame with an object on a first side of a vehicle outboard of the sub-frame comprising:
- a deflector attached to the sub-frame laterally outboard of the sub-frame, the deflector being secured to the sub-frame at an angle relative to a longitudinal direction, wherein the deflector rotates the vehicle to move the first side toward a longitudinal centerline during the impact, wherein the deflector is secured to the sub-frame at an inboard end of the deflector, the apparatus further comprising a reaction leg secured to the deflector at an outboard end of the deflector on a first end and to the sub-frame on a second end, wherein the reaction leg reinforces the deflector to reduce deformation of the outboard end toward the sub-frame; and
- an attachment leg extending rearward from the second end of the reaction leg, the attachment leg being secured in a parallel relationship to a longitudinally extending beam of the sub-frame.

2. The apparatus of claim 1 wherein the sub-frame is disposed about an engine of the vehicle.

3. The apparatus of claim 1 wherein the deflector is oriented at an angle of between 15° and 75° relative to a transverse plane.

4. The apparatus of claim 1 wherein the deflector is oriented at an angle of between 40° and 50° relative to a transverse plane.

5. The apparatus of claim 1 wherein the deflector is oriented at an angle of 45° relative to a transverse plane.

6. The apparatus of claim 1 further comprising a bumper beam secured through a plurality of crush cans to a front portion of the sub-frame and a tire and wheel assembly laterally outboard of the sub-frame, wherein the deflector is located between the bumper beam and the tire and wheel assembly.

7. An apparatus for managing kinetic energy of a frontal impact with an object in a vehicle having a passenger compartment, the apparatus comprising:
- a frame assembly;
- a bumper beam attached to the frame assembly;
- an impact force absorbing element attached between the frame assembly and the bumper beam;
- a pair of deflectors disposed laterally outboard of the frame assembly and spaced rearward from the bumper beam, the deflectors are attached to the frame assembly at an inboard end of each of the deflectors at an angle of between 15° and 75° relative to a transverse plane with a leading inner end a trailing outer end, wherein if the impact with the object occurs outboard from the frame assembly so that the frontal impact is not fully absorbed by the impact absorbing element, the vehicle rotates away from the object to reduce intrusion of the object into the vehicle toward the passenger compartment;
- a reaction leg secured to each of the deflectors at an outboard end of each of the deflectors on a first end of each of the reaction legs and to the frame assembly on a second end of each of the reaction legs, wherein the reaction legs reinforce each of the deflectors to reduce deformation of the outboard ends toward the frame assembly; and
- an attachment leg extending rearward from the second end of each of the reaction legs, the attachment legs each being secured in a parallel relationship to a pair of longitudinally extending beams of the frame assembly.

8. The apparatus of claim 7 wherein the frame assembly is disposed about an engine of the vehicle.

9. The apparatus of claim 7 wherein each of the deflectors is oriented at an angle of between 40° and 50° relative to a transverse plane.

10. The apparatus of claim 7 wherein each of the deflectors is oriented at an angle of 45° relative to a transverse plane.

11. The apparatus of claim 7 further comprising a pair of tire and wheel assemblies laterally outboard of opposite sides of the frame assembly, wherein the deflectors are each located between the bumper beam and one of the tire and wheel assemblies.

* * * * *